United States Patent
Higuchi et al.

(10) Patent No.: US 9,558,038 B2
(45) Date of Patent: Jan. 31, 2017

(54) MANAGEMENT SYSTEM AND MANAGEMENT METHOD FOR MANAGING INFORMATION PROCESSING APPARATUS

(71) Applicant: FUJITSU LIMITED, Kawasaki-shi, Kanagawa (JP)

(72) Inventors: Yuta Higuchi, Kawasaki (JP); Mio Nakagawa, Numazu (JP); Tsuyoshi Hashimoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/704,316

(22) Filed: May 5, 2015

(65) Prior Publication Data

US 2015/0234681 A1   Aug. 20, 2015

Related U.S. Application Data

(63) Continuation of application No. PCT/JP2012/084236, filed on Dec. 28, 2012.

(51) Int. Cl.
*G06F 9/46* (2006.01)
*G06F 15/173* (2006.01)
*H04B 1/66* (2006.01)
*G06F 9/50* (2006.01)

(52) U.S. Cl.
CPC .................. *G06F 9/5005* (2013.01)

(58) Field of Classification Search
None
See application file for complete search history.

(56) References Cited

U.S. PATENT DOCUMENTS

| 7,529,834 B1* | 5/2009 | Birrell ............... G06F 11/1464 |
| | | 707/999.1 |
| 2006/0045101 A1 | 3/2006 | Cachin |
| 2008/0192653 A1 | 8/2008 | Onodera |
| 2009/0292787 A1 | 11/2009 | Hosokawa |
| 2011/0138396 A1 | 6/2011 | Chen et al. |
| 2012/0155531 A1* | 6/2012 | Yi ...................... H03M 13/356 |
| | | 375/240 |

FOREIGN PATENT DOCUMENTS

| EP | 1944898 | 7/2008 |
| JP | 63-238633 | 10/1988 |

(Continued)

OTHER PUBLICATIONS

Office Action dated Nov. 24, 2015 in corresponding Japanese Patent Application No. 2014-554053.

(Continued)

*Primary Examiner* — Bing Zhao
(74) *Attorney, Agent, or Firm* — Staas & Halsey LLP

(57) ABSTRACT

A system to which the present invention has been applied includes a plurality of information processing apparatuses connected to each other and a management device that divides a first number of pieces of management data needed for management of the plurality of information processing apparatuses into a second number of pieces of management data, the second number being equal to or greater than the first number, and that transmits the second number of pieces of management data obtained by the division respectively to the plurality of information processing apparatuses.

9 Claims, 22 Drawing Sheets

(56) References Cited

FOREIGN PATENT DOCUMENTS

| JP | 8-87480 | 4/1996 |
|----|---------|--------|
| JP | 10-21103 | 1/1998 |
| JP | 2003-348065 | 12/2003 |
| JP | 2006-227763 | 8/2006 |
| JP | 2008-153735 | 7/2008 |
| JP | 2008-176615 | 7/2008 |
| JP | 2008-198025 | 8/2008 |
| JP | 2011-118899 | 6/2011 |

OTHER PUBLICATIONS

International Search Report mailed Feb. 5, 2013 in corresponding International Application No. PCT/JP2012/084236.
Written Opinion of the International Searching Authority mailed Feb. 5, 2013 in corresponding International Application No. PCT/JP2012/084236.
Extended European Search Report mailed Jan. 7, 2016 in corresponding European Patent Application No. 12891213.6.
Japanese Office Action dated Mar. 8, 2016 in corresponding Japanese Patent Application No. 2014-554053.
Japanese Decision for Dismissal of Amendment dated Aug. 9, 2016 in corresponding Japanese Patent Application No. 2014-554053.

* cited by examiner

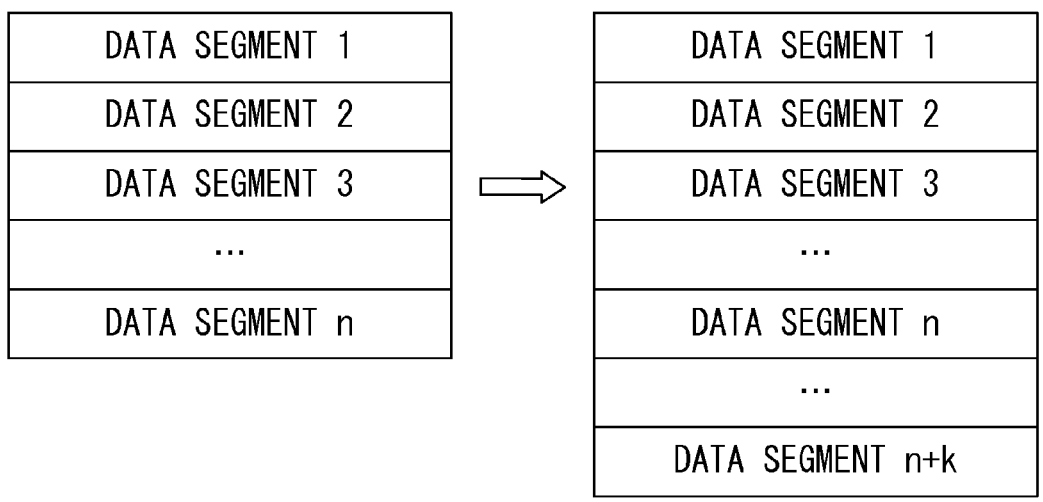
F I G. 4

FIG. 5A $$t(i) = s(i) \quad (1 \leq i \leq n)$$

$$t(n+1) = a(1,1)^* \cdot s(1) + \cdots + a(1,n)^* \cdot s(n) \quad vt(n+1) = (a(1,1), \ldots, a(1,n))$$

$$t(n+2) = a(2,1)^* \cdot s(1) + \cdots + a(2,n)^* \cdot s(n) \quad vt(n+2) = (a(2,1), \ldots, a(2,n))$$

$$t(n+3) = a(3,1)^* \cdot s(1) + \cdots + a(3,n)^* \cdot s(n) \quad vt(n+3) = (a(3,1), \ldots, a(3,n))$$

$$\vdots$$

$$t(n+k) = a(k,1)^* \cdot s(1) + \cdots + a(k,n)^* \cdot s(n) \quad vt(n+k) = (a(k,1), \ldots, a(k,n))$$

FIG. 5C

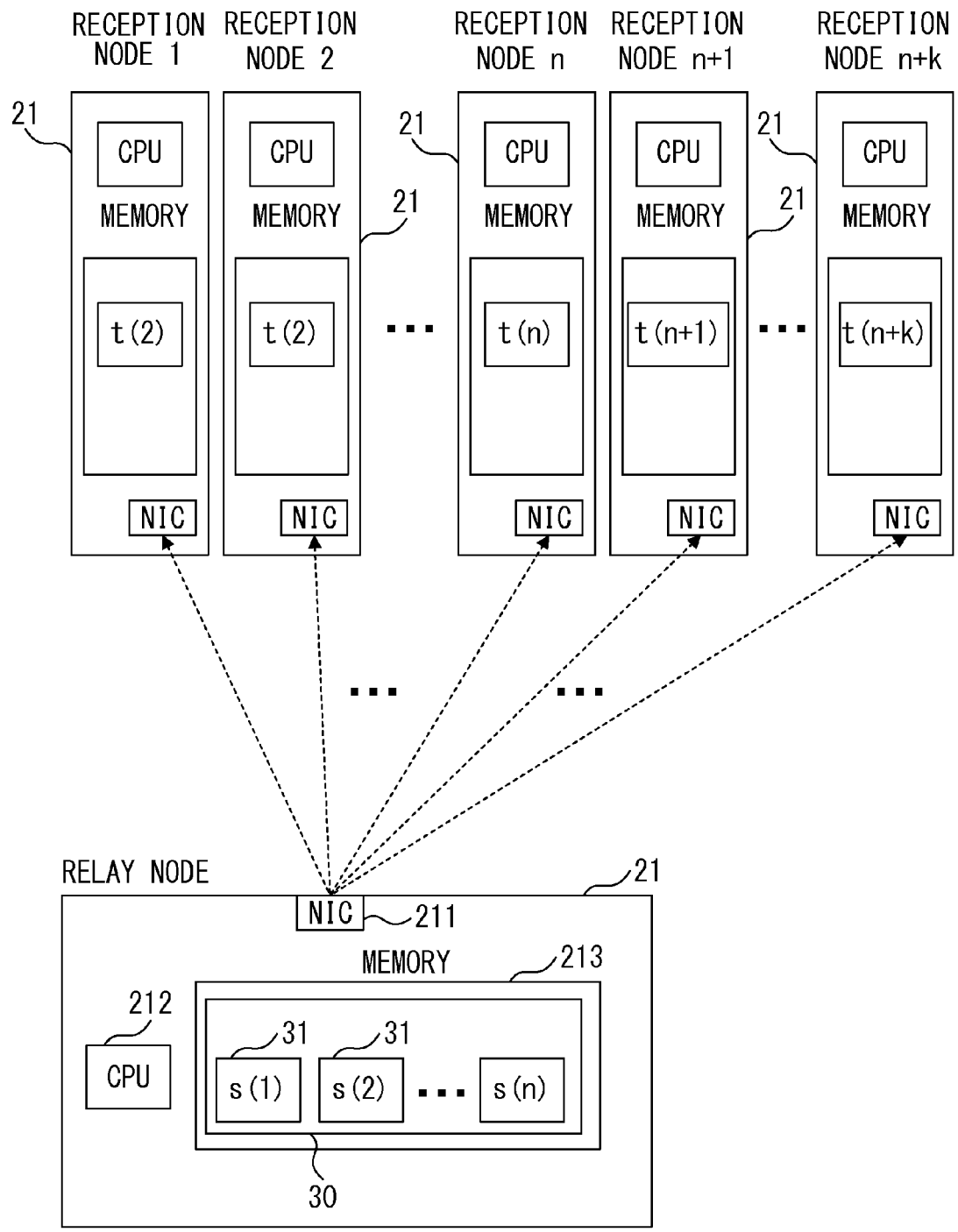
F I G. 6

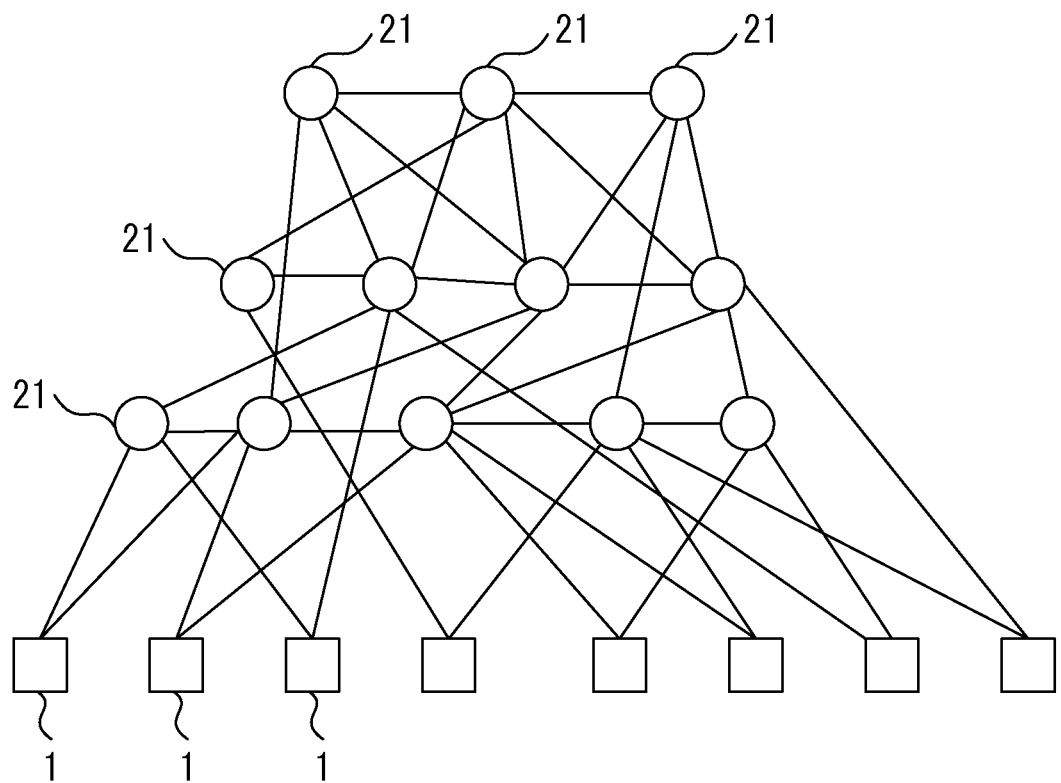
F I G. 7

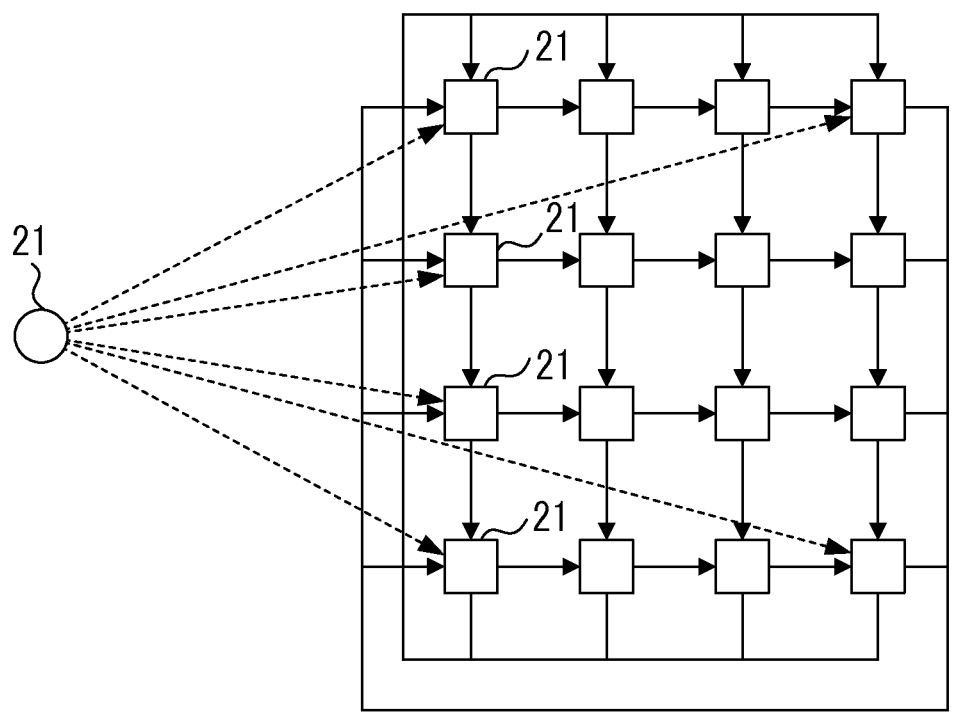
F I G. 8B

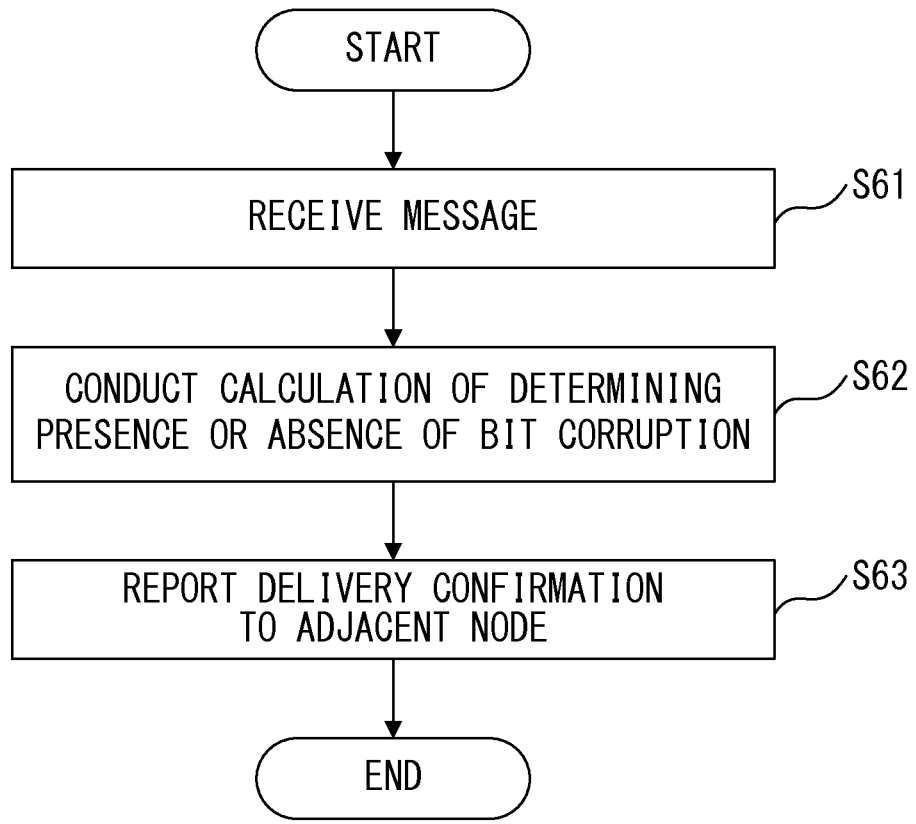
F I G. 1 5

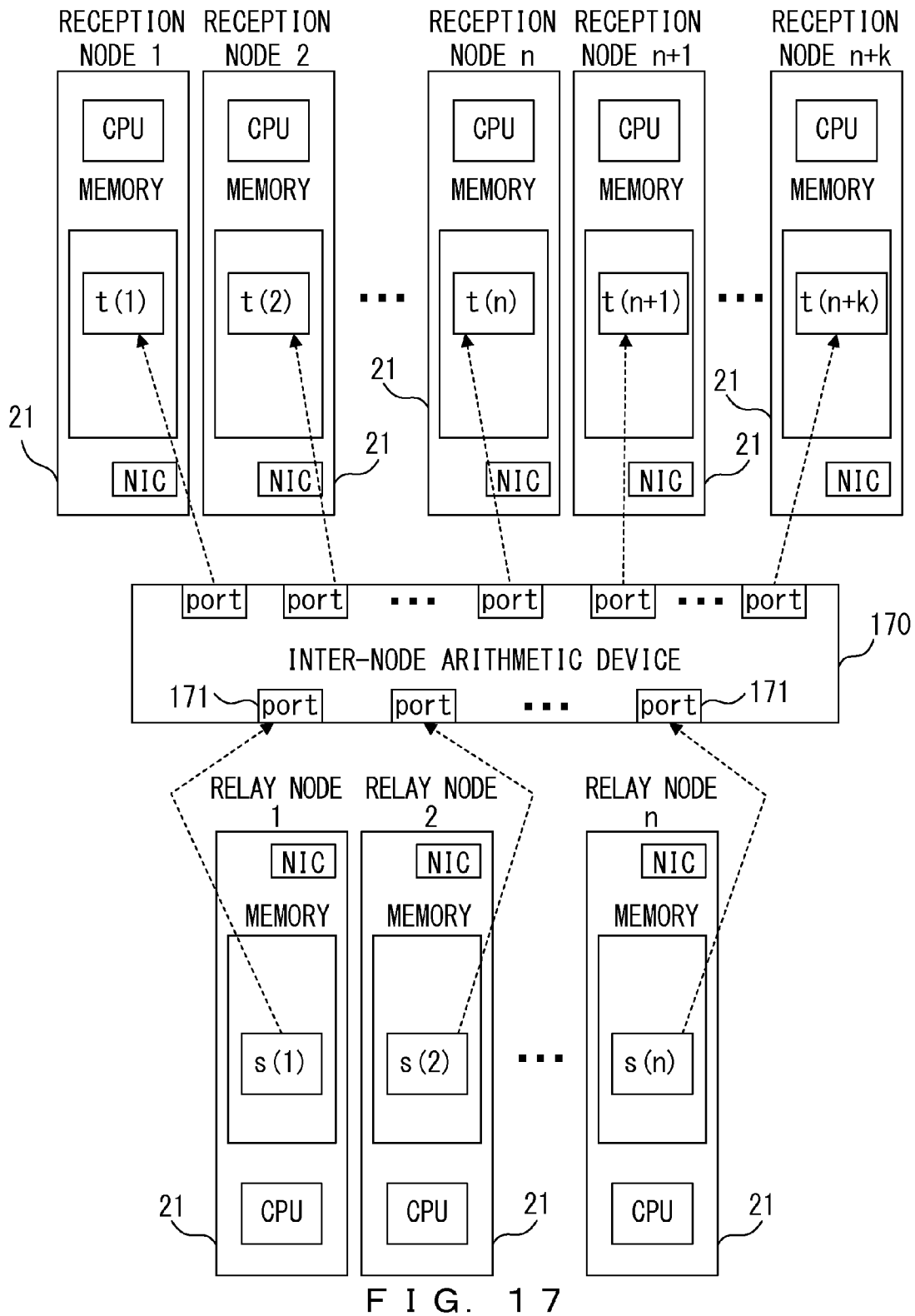
F I G. 1 7

MANAGEMENT SYSTEM AND MANAGEMENT METHOD FOR MANAGING INFORMATION PROCESSING APPARATUS

CROSS-REFERENCE TO RELATED APPLICATION

This application is a continuation application of International Application PCT/JP2012/084236 filed on Dec. 28, 2012, and designated the U.S., the entire contents of which are incorporated herein by reference.

FIELD

The embodiments discussed herein are related to an information processing system, and a management method of an information processing system.

BACKGROUND

In recent years, there has been an increasing demand for a computer system used as an information processing system that connects many computers (referred to as "calculation nodes" hereinafter) as information processing apparatuses to a network and makes the plurality of calculation nodes parallelly perform calculation processes (referred to as "jobs" hereinafter) in a distributed manner. In a computer system of this type, a management computer (referred to as a "management node" hereinafter) is used for managing and controlling the hardware of each calculation node and jobs to be processed by a calculation node group.

In a large-scale computer system, it is difficult to make a single management node manage all the computers because such a configuration would prolong a time taken to perform such management, deteriorating the processing performance. Accordingly, large-scale computer systems usually employ distributed processing by using a plurality of management nodes.

FIG. 1 explains a management method of a computer system that uses conventional management nodes. In FIG. 1, calculation nodes are denoted by "1" while management nodes are denoted by "2 (2-1, 2-2)".

As illustrated in FIG. 1, in a case of a large-scale computer system, the management nodes 2 are hierarchized into a tree structure. In FIG. 1, the management node 2-1 is the management node 2 serving at the top level in the tree structure and controls the management nodes 2-2, which are at a lower level than the management node 2-1. The management nodes 2-2 control management nodes 2-3, which are at a lower level than the management nodes 2-2. Each management node 2-3 manages calculation nodes 1 that are its management target. The management nodes 2 (2-2 and 2-3) that are controlled by the management nodes 2 (2-1 or 2-2) of higher levels will be referred to as "management sub nodes" hereinafter. The management node 2-1, which is at the top level, will be referred to as the "top-level management node" hereinafter.

In the hierarchization of the management nodes 2 as illustrated in FIG. 1, the management nodes 2 that control the lower-level management sub nodes 2 indirectly manage the calculation nodes 1 via the respective management sub nodes 2. Accordingly, the hierarchical relationships between the management nodes 2 correspond to the inclusive relationships between the management nodes 2 that control the lower-level management sub nodes 2 and the group of the calculation nodes 1 that are directly or indirectly managed by the management nodes 2. Also, the hierarchical relationships correspond to paths used for distributing an instruction message from the top-level management node 2-1 to the respective calculation nodes 1 and paths used for transmitting information from the respective calculation nodes 1 to the top-level management node 2-1.

In a computer system as illustrated in FIG. 1, when one of the plurality of management nodes 2 has failed, some calculation nodes 1 become unable to be managed depending upon the management node 2 that has failed. Accordingly, computer systems need to be made redundant in order to increase reliability.

The hierarchical relationships between the management nodes 2 illustrated in FIG. 1 are in a fixed tree structure, and each management node 2 needs to perform a task that is specific to the position in the hierarchical relationships (tree structure). As a general rule, when the reliability of a system is to be increased, consideration is given to two conditions; (a) maintaining the function of the system and (b) preserving data being processed. Partly because these two conditions need to be taken into consideration, when the hierarchical relationships of the management nodes 2 as illustrated in FIG. 1 exist, the process of making the management nodes 2 redundant needs to be conducted for each of the management nodes 2.

As described above, in a computer system, jobs that are processed by a group of the calculation nodes 1 are managed and controlled. Data of condition (b) includes information related to the management or control of jobs. When such information has been lost, the loss has a great negative influence on the operation and management of the entire computer system. Accordingly, condition (b) is also very important.

In order to increase the reliability of a computer system, robustness against multiple failures is needed. When a tree structure (hierarchical relationship) of management nodes as illustrated in FIG. 1 is employed, the multiplicity of each management node needs to be (1+k) times higher in order to attain the robustness against k-fold failures (k is an integer equal to or greater than one).

Today, robustness against multiple failures has been realized in large-scale computer systems as well. Such robustness is realized by preparing a computer used for preserving data in each node (vertex or nodal point) in a tree structure and by saving data for a plurality of nodes to that computer. This realization method can reduce the number of computers for replacing the management nodes 2 that have failed. However, communications between nodes have to be conducted in order to save data. These communications cause a delay. This delay hinders rapid execution of control of a group of the calculation nodes 1, responses to failures in the management nodes 2, etc. Accordingly, it is difficult to employ this realization method for a computer system that is subject to a strict limitation regarding a communication delay time.

As described above, each of the management nodes 2 needs to perform a task specific to the position in the hierarchical relationships (tree structure). Because of this, a realization method may be possible in which the management node 2 for replacement is prepared for each node in a tree structure and each of the management nodes 2 for replacement preserves data. This realization method can be used for a computer system that is subject to a strict limitation regarding a communication delay time because saved data does not need to be accessed.

However, when the total number of nodes (vertex or nodal point) representing the management nodes 2 is M in the tree structure and the multiplicity of the load distribution in a node in this tree structure is m(p), the total number of nodes needed to attain the robustness against k-fold failures is a value resulting from the calculation of M×(1+k). Because the number of nodes needed for an arbitrary node is obtained from m (p)×(1+k), M=Σm(p) is satisfied.

In this realization method, it is needed to prepare a number of the management nodes 2 for replacement in accordance with the number of nodes and the value of k that is assumed. In a large-scale computer system, the number of nodes is very large. Accordingly, a very large number of the management nodes 2 for replacement have to be prepared, leading to immense resources in a backup system for the redundancy. The existence of a backup system having immense resources increases the construction costs of the computer system and the operational costs as well. In view of this, it is also important to suppress the resources of a backup system when robustness against multiple failures is to be attained.

Patent Document 1: Japanese Laid-open Patent Publication No. 2008-153735

Patent Document 2: Japanese Laid-open Patent Publication No. 10-21103

SUMMARY

A system to which the present invention has been applied includes a plurality of information processing apparatuses that are connected to each other, and a management device configured to divide a first number of pieces of management data needed for management of the plurality of information processing apparatuses into a second number of pieces of management data, the second number being equal to or greater than the first number, and to transmit the second number of pieces of management data obtained by the division respectively to the plurality of information processing apparatuses.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF THE DRAWINGS

FIG. 4 explains manipulations conducted on management data;

FIG. 5A explains manipulations conducted on management data in detail (first);

FIG. 5C explains manipulations conducted on management data in detail (third);

FIG. 6 explains a transmission method of management data;

FIG. 7 explains connection relationships between management nodes;

FIG. 8B explains a confirmation method of loss-correction code segments that were transmitted (in a case where a two-dimensional torus is used);

FIG. 15 is a flowchart of a message reception process (variation example);

FIG. 17 explains a system configuration example to which a different embodiment has been applied;

DESCRIPTION OF EMBODIMENTS

Figure 1:
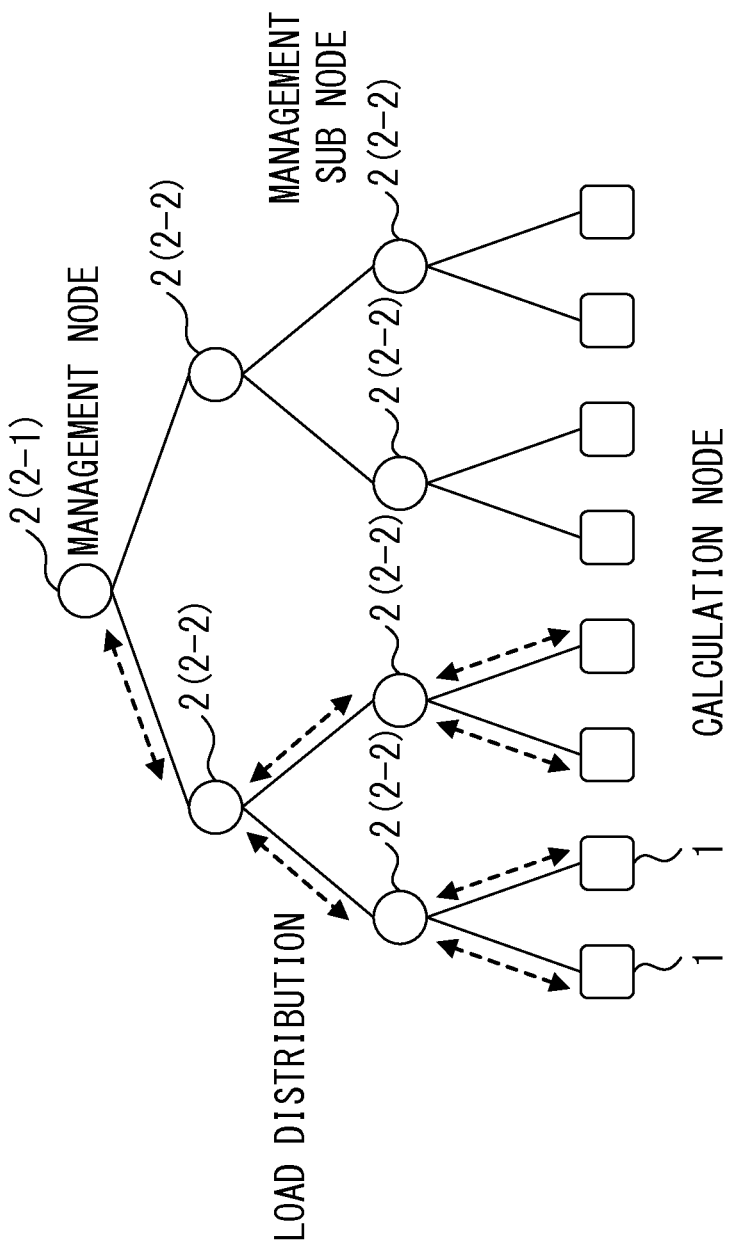
FIG. 1 explains a management method of a computer system that uses conventional management nodes.

Hereinafter, detailed explanations will be given for the embodiments of the present invention by referring to the drawings.

Figure 2:
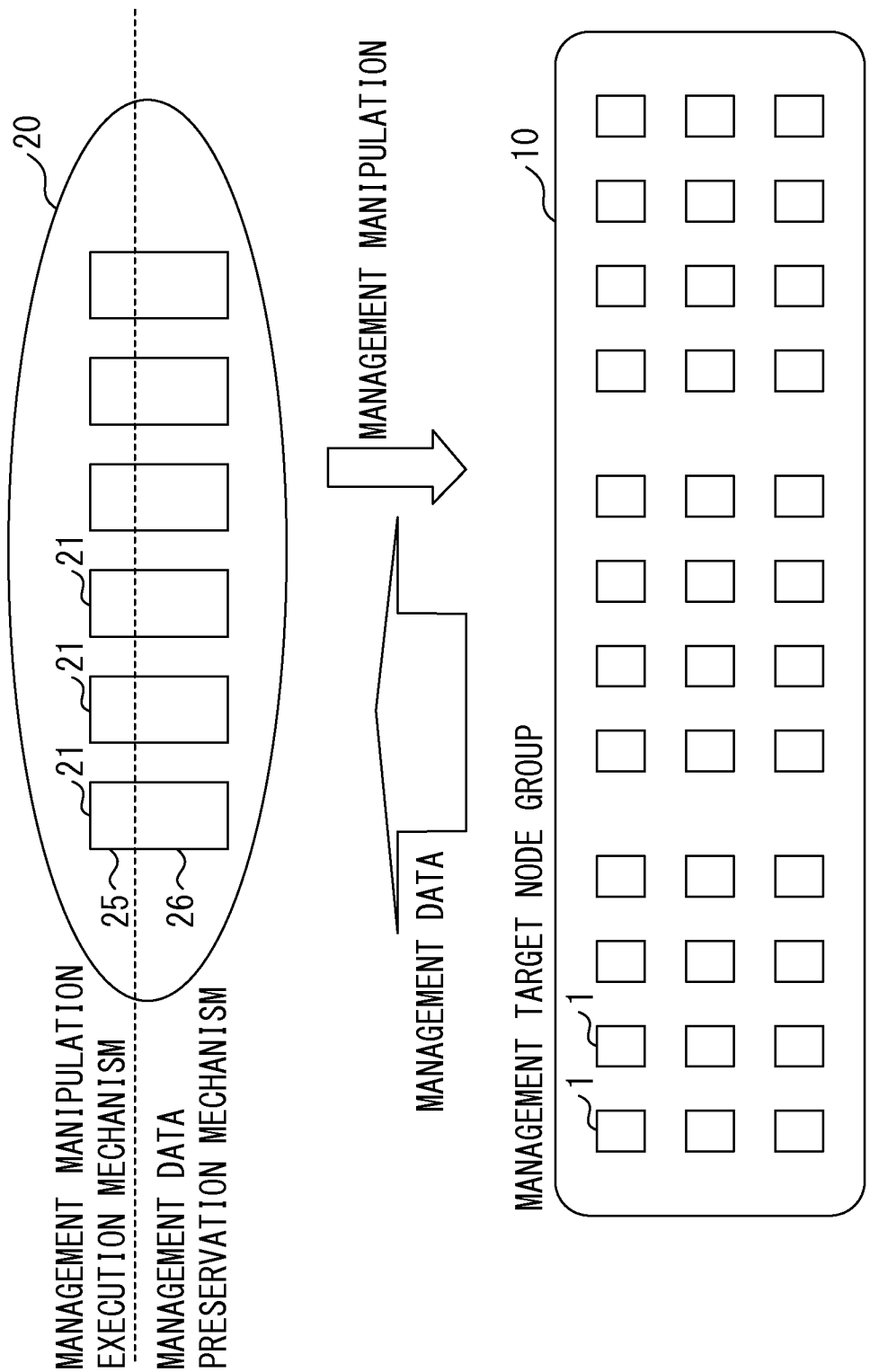
FIG. 2 explains configurations that realize an information processing system, a management method of an information processing system, and a management program of an information processing system according to the present embodiment.

FIG. 2 explains configurations that realize an information processing system, a management method of an information processing system, and a management program of an information processing system according to the present embodiment. In FIG. 2, a management target node group including computers 1 of a computer system that is an information processing system according to the present embodiment is denoted by "10" while a management mechanism group provided for the management of the management target node group 10 is denoted by "20".

The management mechanism group 20 includes a plurality of management nodes 21. Each of the management nodes 21 includes a management manipulation execution mechanism 25 and a management data preservation mechanism 26.

The management manipulation execution mechanism 25 provides a function of managing the management target node group 10. By using this function, management manipulations such as the activation/halting of each computer 1, specifying of jobs to be executed, etc. are conducted. The management manipulation of each computer 1 is realized by the transmission of a message representing the contents of the management manipulation. Such a message will be referred to as a "management manipulation message" hereinafter.

The management data preservation mechanism 26 provides a function of preserving data needed to manage the management target node group 10 (referred to as "management data" hereinafter). Examples of management data transmitted from each computer 1 include data specifying jobs that are being executed, data indicating the status of constituent components, etc.

As described above, the management manipulation execution mechanism 25 and the management data preservation mechanism 26 provided to each management node 21 provide the functions needed for the operation as the management node 21. Thereby, the management target node group 10 is managed by the management mechanism group 20.

The management manipulation execution mechanism 25 and the management data preservation mechanism 26 provided to each management node 21 operate independently from each other. The purpose of this is to reduce the possibility that the halting of one of the management manipulation execution mechanism 25 and the management data preservation mechanism 26 will halt the other. The independent operations of the management manipulation execution mechanism 25 and the management data preservation mechanism 26 can be realized by separating at least some of the hardware groups needed for those operations. The operations that are independent from each other may be realized by using a virtual machine and may also be realized by treating the management manipulation execution mechanism 25 and the management data preservation mechanism 26 as separate and independent devices.

Figure 3:
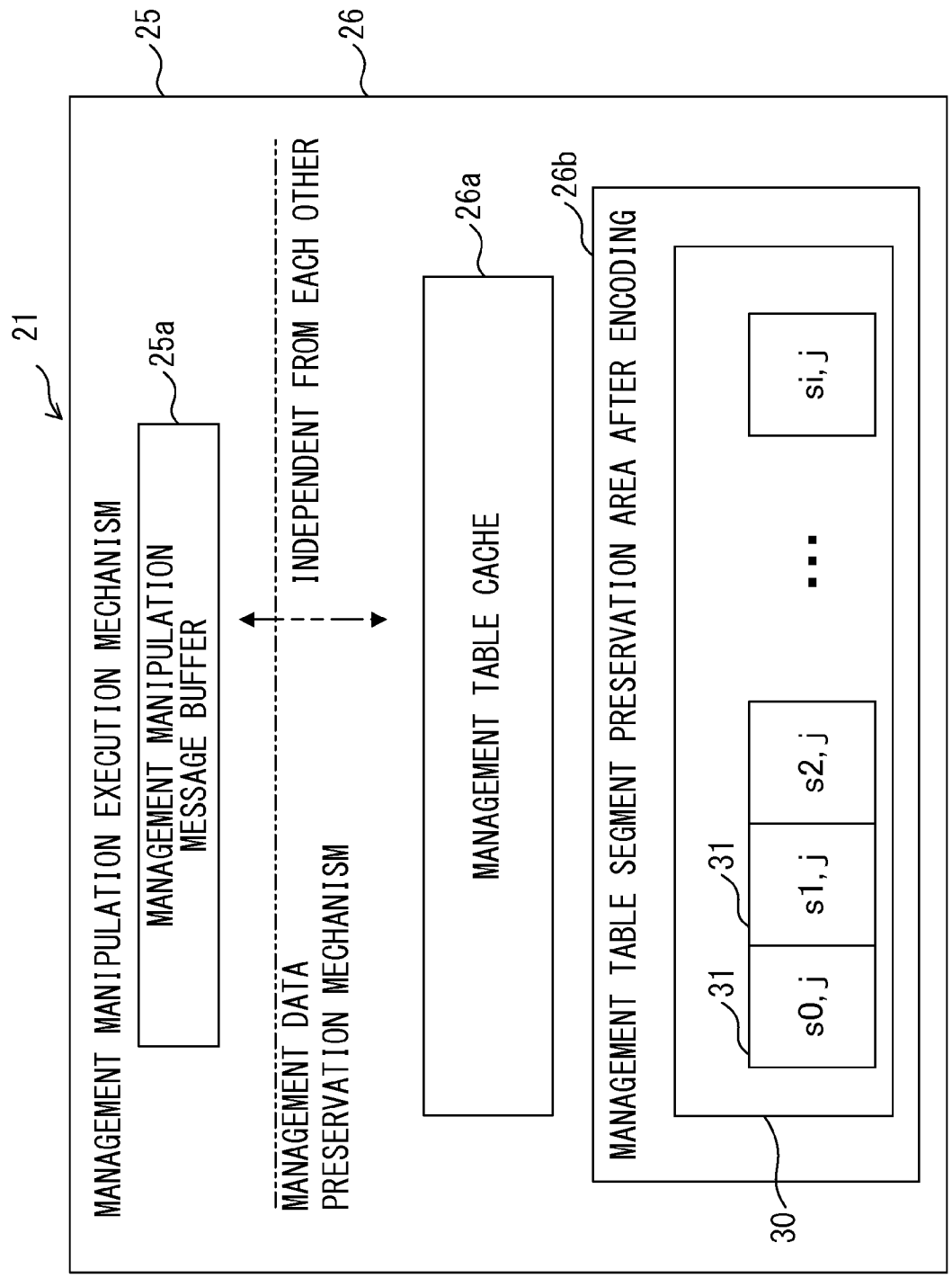
FIG. 3 explains a management node used in the present embodiment.

FIG. 3 illustrates a management node used in the present embodiment. As illustrated in FIG. 3, in the management node 21, the management manipulation execution mechanism 25 and the management data preservation mechanism 26 operate independently from each other. In the management manipulation execution mechanism 25, a management manipulation message buffer 25a, which is a storage device used for storing the above management manipulation messages, is provided. In the management data preservation mechanism 26, a management data cache 26a and a management data segment preservation area 26b are secured. The management data cache 26a and the management data segment preservation area 26b are for example storage areas secured in a memory provided to the management node 21.

In the present embodiment, the transmission of a management manipulation message from each management manipulation execution mechanism 25 to a different management manipulation execution mechanism 25 utilizes the multicast function, by which a message is simultaneously transmitted to a plurality of transmission destinations, and such a multicast is conducted targeting a plurality of different management manipulation execution mechanisms 25. When at least one management manipulation execution mechanism 25 that has received, via the transmission of the management manipulation message utilizing the multicast function, the same management manipulation message operate normally, it is possible to continue the management of the management target node group 10. Thereby, a high reliability is realized. Also, it is sufficient when at least one of the management manipulation execution mechanisms 25 that have received the same management manipulation message operates normally, and accordingly it is also possible to make the respective management manipulation execution mechanisms 25 receive a plurality of different management manipulation messages. Thereby, it is possible to suppress the number of the management manipulation execution mechanisms 25 that are to be prepared.

Meanwhile, the transmission of management data from each management data preservation mechanism 26 to a different management data preservation mechanism 26 is conducted as described below.

FIG. 4 explains manipulations conducted on management data.

In the present embodiment, as illustrated in FIG. 4, management data is divided into n (n is a positive integer) segments and n+k segments are generated from n segments. "k" (k is a positive integer) is the number of multiple failures to which it is possible to respond to. Accordingly, n+k segments are treated as segments that allow the restoration of the original management data even when k segments have been lost from those n+k segments.

Those n+k segments can be generated in for example the following manner. Specific explanations will be given by referring to FIG. 5A through FIG. 5C.

First, as illustrated in FIG. 5A, all of the original data is divided by n. This division by n is conducted in such a manner that each segment will have an equal length (data amount). Accordingly, when the original data is not an integer multiple of e bits (e is a positive integer), as many bits of the value zero as are needed are added to the tail. The number of added bits are recorded.

Next, it is assumed that $q=2^e$ is satisfied and the original data is treated as n-dimensional vectors of a finite field GF (q) component. In this example, the original data is treated as v.

A matrix, with n rows and n+k columns, that satisfies the conditions below over GF (q) is selected arbitrarily. The selected matrix is treated as G. Each column in G is referred to as a "code segment vector".

Figure 5B:
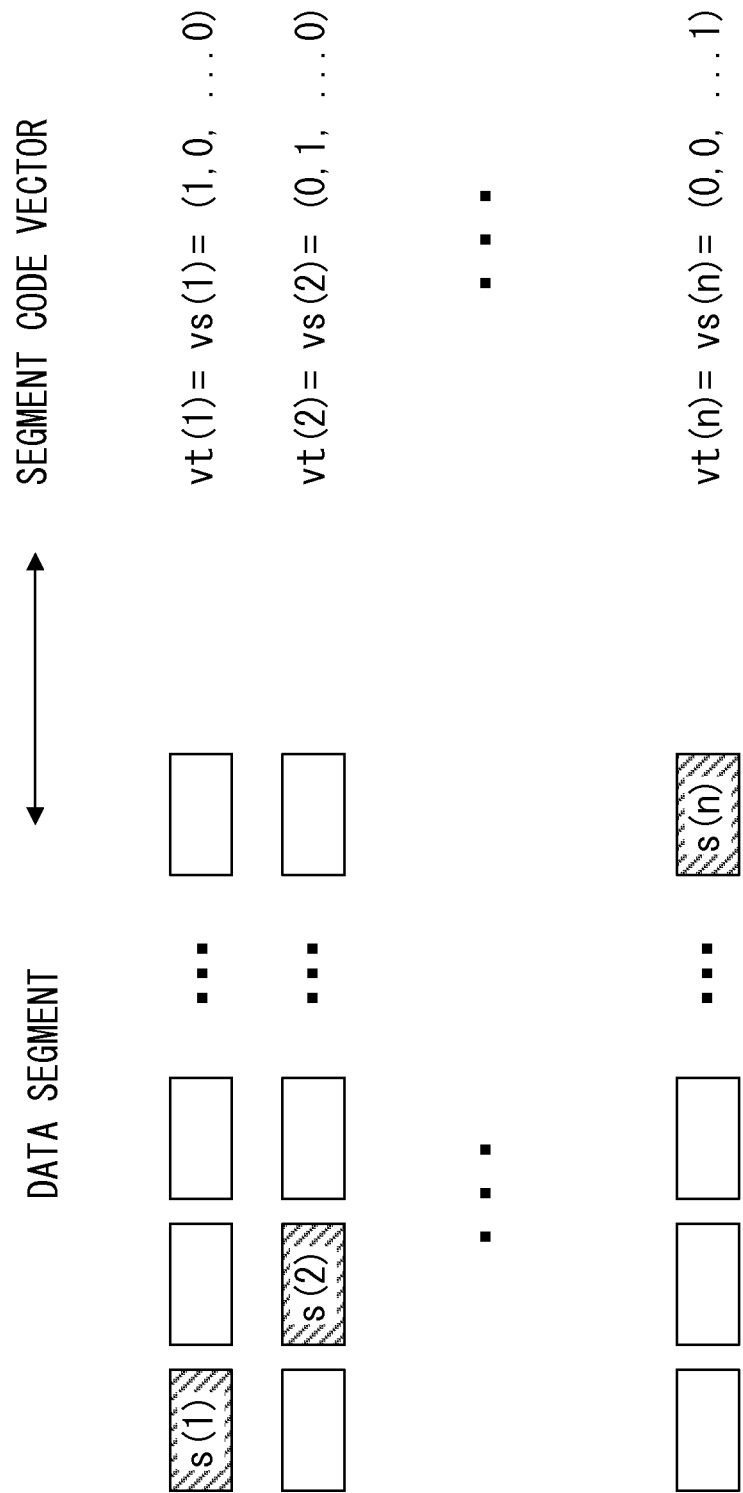
FIG. 5B explains manipulations conducted on management data in detail (second)

Condition 1: arbitrary n columns are liner independent
Condition 2: the first n columns are a unit matrix with n rows and n columns It is assumed that $u=vG$ is satisfied. As illustrated in FIG. 5B, vG is n+k dimensional vectors obtained by multiplying v by G from the right. u of those n+k dimensional vectors becomes the above n+k segments.

The restoration of the original data from u can be conducted in for example the following manner.

An n element is selected arbitrarily from among elements that have not been lost in u, i.e., from among elements whose contents are appropriate. It is assumed that the vector of the selected n element is w.

It is assumed that $w=vP$ is satisfied. P is a matrix obtained by selecting, from G, a column of the same number as in the case of obtaining w from u.

When the inverse matrix of P is Q, $v=wQ$ is satisfied and v is restored by using Q. When the original data has been divided while adding bits, the original data is restored by taking the number of the added bits into consideration.

The management data cache 26a illustrated in FIG. 3 is used for storing management data obtained from the computer 1 that is a management target or restored management data. The management data segment preservation area 26b is used for storing the generated n+k segments or a received segment. In FIG. 3, the generated or received segments are denoted by 31. An area secured for storing the segments 31 for each piece of management data (referred to as an "individual preservation area" hereinafter) is denoted by 30. The segments 31 thereof will be referred to as "loss-correction code segments" hereinafter.

FIG. 6 illustrates a transmission method of management data.

Each management node 21 includes an NIC (Network Interface Card) 211, a CPU (Central Processing Unit) 212 and a memory 213. As described above, the management node 21 that transmits management data generates n+k segments and transmits the generated n+k segments to different management nodes 21 independently.

FIG. 7 explains connection relationships between the management nodes.

As illustrated in FIG. 7, each management node 21 is connected to a plurality of different management nodes 21. Thereby, it is possible to transmit a management manipulation message to a plurality of the management nodes 21 by multicast and to transmit the loss-correction code segments 31 to a plurality of the management nodes 21.

The loss-correction code segments 31 allow the restoration of the original management data even when up to k loss-correction code segments 31 are lost. This makes it possible to secure high reliability.

When the respective loss-correction code segments 31 are transmitted to the management nodes 21 (management data preservation mechanisms 26) that are different from each other so as to make them store the loss-correction code segments 31, it is possible to suppress the number of nodes needed to store the loss-correction code segments 31 in comparison with the conventional method, in which a copy of all of the data needed for the respective management nodes illustrated in FIG. 1 is held by a node for redundancy. Specifically, the number of redundant nodes for k-fold failures is 1+k according to the conventional method while the number becomes (1+INT(k/n)) according to the present embodiment. INT(k/n) is a value obtained by rounding up k/n into an integer.

Also, the transmission and reception by multicast leads to the following advantages.

When the transmission of management data is conducted by using unicast only targeting one management node in the hierarchical relationship between the management nodes as illustrated in FIG. 1, the number of the layers in the tree structure, i.e., the number of the relay stages of the nodes is large in a large-scale computer system, leading to large communication delays. Relaying by nodes causes a delay that is approximately two digits greater than a transmission time on a communication medium. This also increases the possibility of failures.

However, in a transmission using multicast, it is possible as illustrated in FIG. 7 to conduct a transmission that is not based on the hierarchical relationship. This makes it possible to further reduce the number of layers in a tree structure, i.e., the number of relay stages of nodes. Thereby, it is possible to increase the robustness against failures and also suppress communication delays further.

Figure 8A:
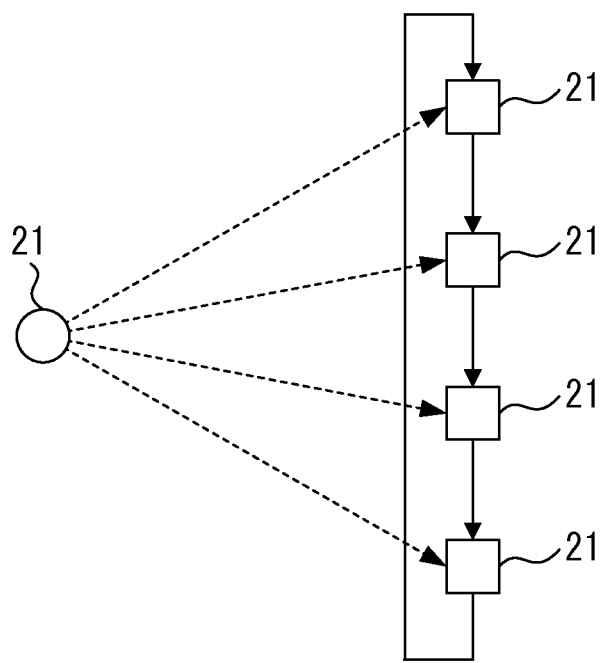
FIG. 8A explains a confirmation method of loss-correction code segments that were transmitted (in a case where a one-dimensional torus is used)

FIG. 8A and FIG. 8B explain a confirmation method of loss-correction code segments that were transmitted. FIG. 8A illustrates a case using a one-dimensional torus in which a plurality of nodes are connected circularly, and FIG. 8B illustrates a case using a two-dimensional torus in which the edges of a plurality of nodes connected in a meshed manner are connected.

FIG. 8A illustrates an example of a case where the loss-correction code segments 31 are transmitted to four management nodes 21 from one management node 21. The four management nodes 21 form a one-dimensional torus, and the delivery confirmation of the loss-correction code segments 31 is conducted between the management nodes 21 that are adjacent to each other in the one-dimensional torus. Also, between those management nodes 21, the loss-correction code segments 31 are transmitted and received along for example the arrows in FIG. 8A. By the transmission and reception of the loss-correction code segments 31, all loss-correction code segments 31 are collected to for example the management node 21 located at the bottom end in FIG. 8A. In FIG. 8B similarly, all loss-correction code segments 31 are collected to the management node 21 located at the bottom right end.

Figure 16:
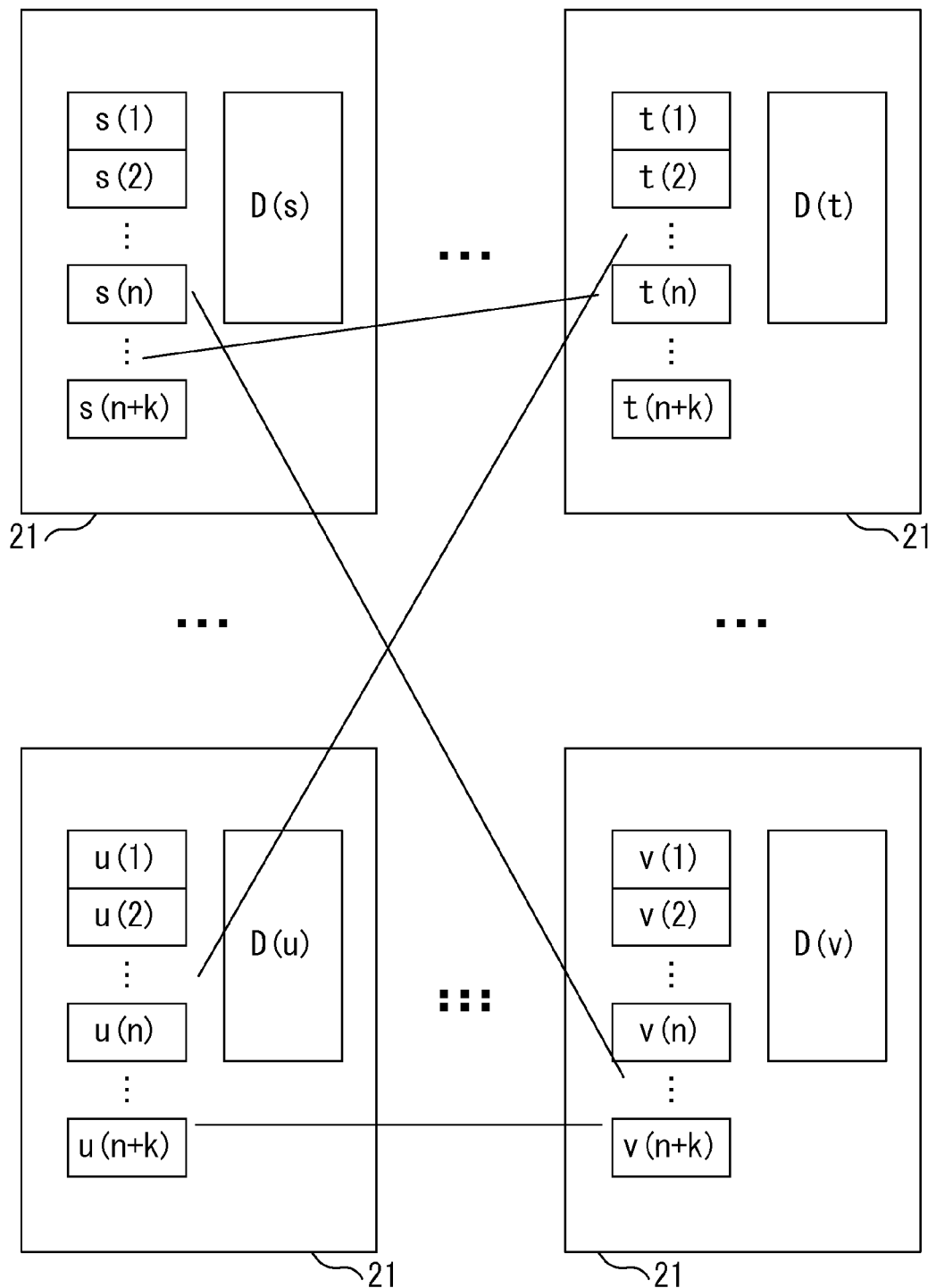
FIG. 16 explains a preservation method of data.

The management node 21 that has been determined by the delivery confirmation to have failed is excluded from the collection targets of the loss-correction code segments 31. However, even when failures have occurred in k management nodes 21, it is possible to restore the original management data. Accordingly, as illustrated in FIG. 16, the management nodes 21 to which the loss-correction code segments 31 are transmitted may be made to function as storage devices for storing management data in a distributed manner. By using the management nodes 21 for storing management data, it is possible to promptly respond to a failure in any of the management nodes 21.

The torus as illustrated in FIG. 8A or FIG. 8B is an arrangement in which pieces of data are collected to each management node 21 by delivery confirmation. Depending upon connection relationships between the management nodes 21, there may be a case where it is not possible to transmit data by multicast from one management node 21 to all the management nodes 21 that are to receive the data. Accordingly, the torus as illustrated in FIG. 8A or FIG. 8B may also be used for the purposes of causing the management nodes 21 to which it is not possible to directly transmit the loss-correction code segments 31 to obtain/store the loss-correction code segments 31 that are needed.

Hereinafter, attention is paid to the CPU 212 provided to the management node 21 so as to explain the operations thereof. The operations are realized by the CPU 212 executing a program read to the memory 213. A program read to the memory 213 may be one that has been stored in a non-volatile storage device provided to the management node 21 or may be one that has been obtained from an external environment.

Figure 9:
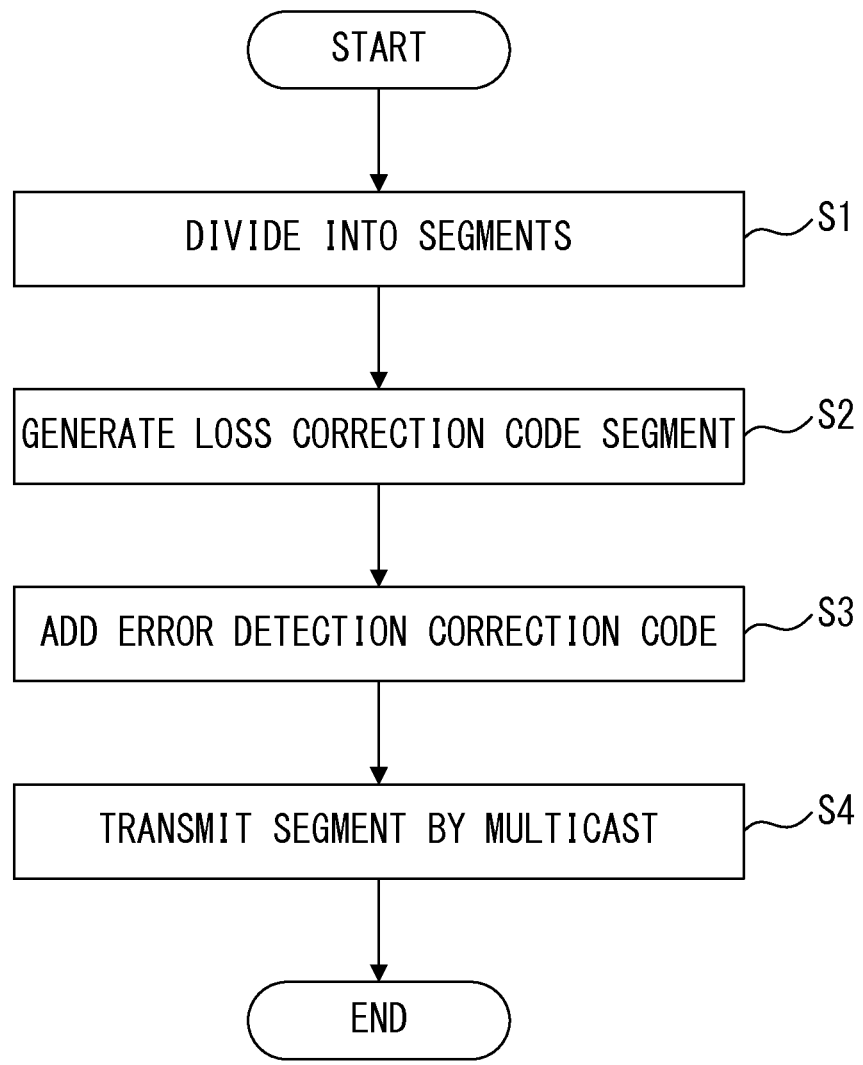
FIG. 9 is a flowchart of a management data transmission process.

FIG. 9 is a flowchart of a management data transmission process. This management data transmission process is a process for transmitting management data that is a transmission target. This management data transmission process is triggered by for example the obtainment of management data from the management target node group 10, the restoration of a plurality of pieces of management data that are to be collected into one piece, etc.

First, the CPU 212 divides the management data by n so as to divide the data into n segments (S1). Next, the CPU 212 generates n+k loss-correction code segments 31 from the n segments (S2) and adds error detection correction codes to the generated respective loss-correction code segments 31 (S3). Thereafter, the CPU 212 transmits, to a plurality of the corresponding management nodes 21, the loss-correction code segments 31 to which the error detection correction codes have been added (S4).

Figure 10:
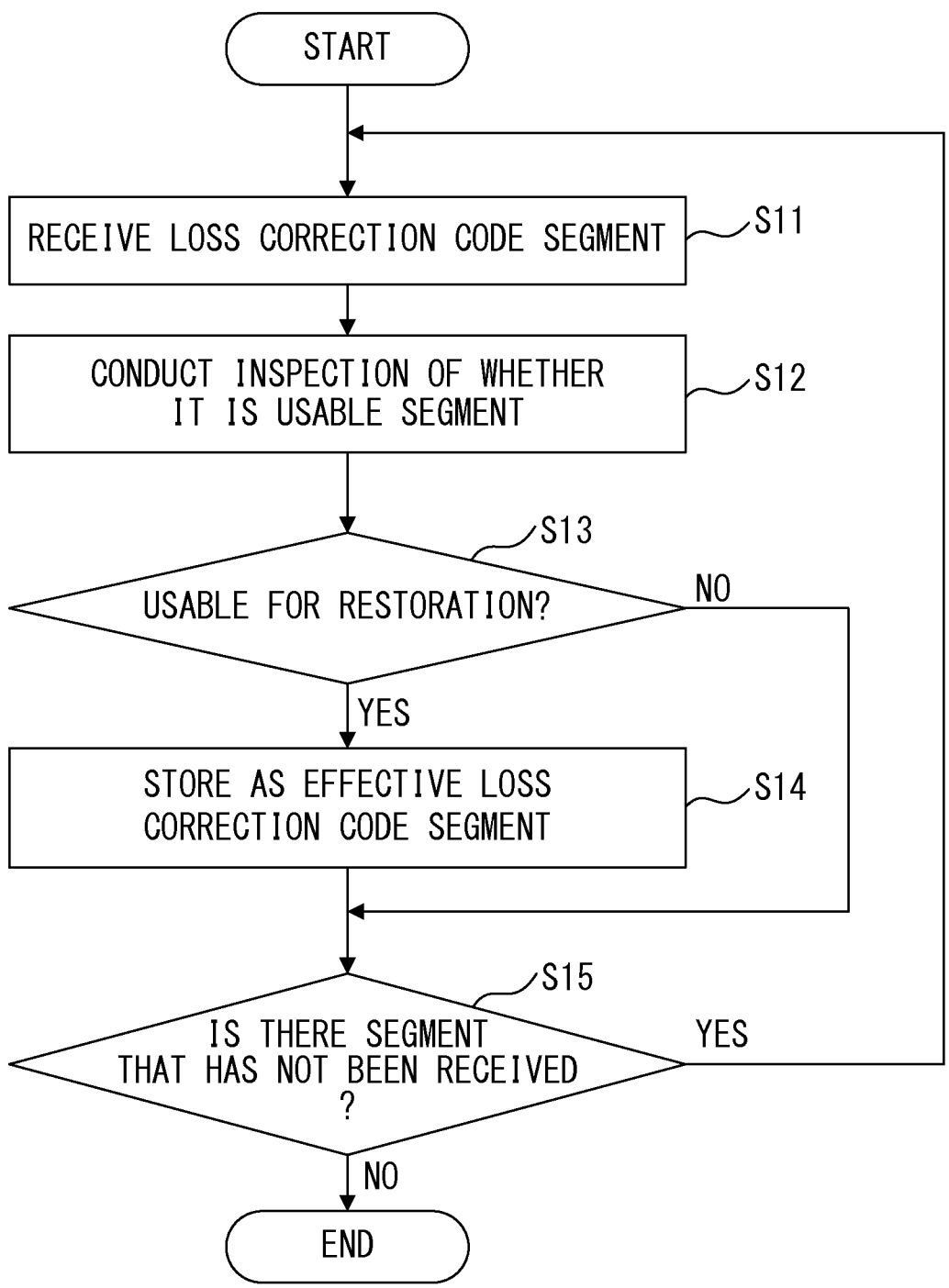
FIG. 10 is a flowchart of a segment reception process.

FIG. 10 is a flowchart of a segment reception process. This segment reception process is a process conducted for the reception of the loss-correction code segments 31 by different management nodes 21. Thereby, this segment reception process is triggered by the reception of the loss-correction code segments 31.

First, the CPU 212 receives the loss-correction code segment 31 received by the NIC 211 (S11). Next, the CPU 212 uses the error detection correction code added to the received loss-correction code segment 31, and conducts an inspection for confirming whether or not an uncorrectable error has occurred, i.e., whether or not that loss-correction code segment 31 is usable for the restoration of the management data (S12).

The CPU 212 that has conducted the inspection next determines whether or not the inspection result indicates that the loss-correction code segment 31 is usable for the restoration of the management data (S13). When no error has occurred in the received loss-correction code segment 31 or when an error has occurred but that error is correctable, the determination in S13 is Yes, and the process proceeds to S14. When an uncorrectable error has occurred in the received loss-correction code segment 31, the determination in S13 is No and the process proceeds to S15.

In S14, the CPU 212 stores the received loss-correction code segment 31 in the corresponding individual preservation area 30 in the management data segment preservation area 26b. Next, the CPU 212 determines whether or not there is a different loss-correction code segment 31 that is to be received (S15). When there is a different loss-correction code segment 31 that is to be received, the determination in S15 is Yes, and the process returns to S11, and the CPU 212 prepares to receive the next loss-correction code segment 31. When there is not a different loss-correction code segment 31 that is to be received, the determination in S15 is No, and then the segment reception process is terminated.

Figure 11:
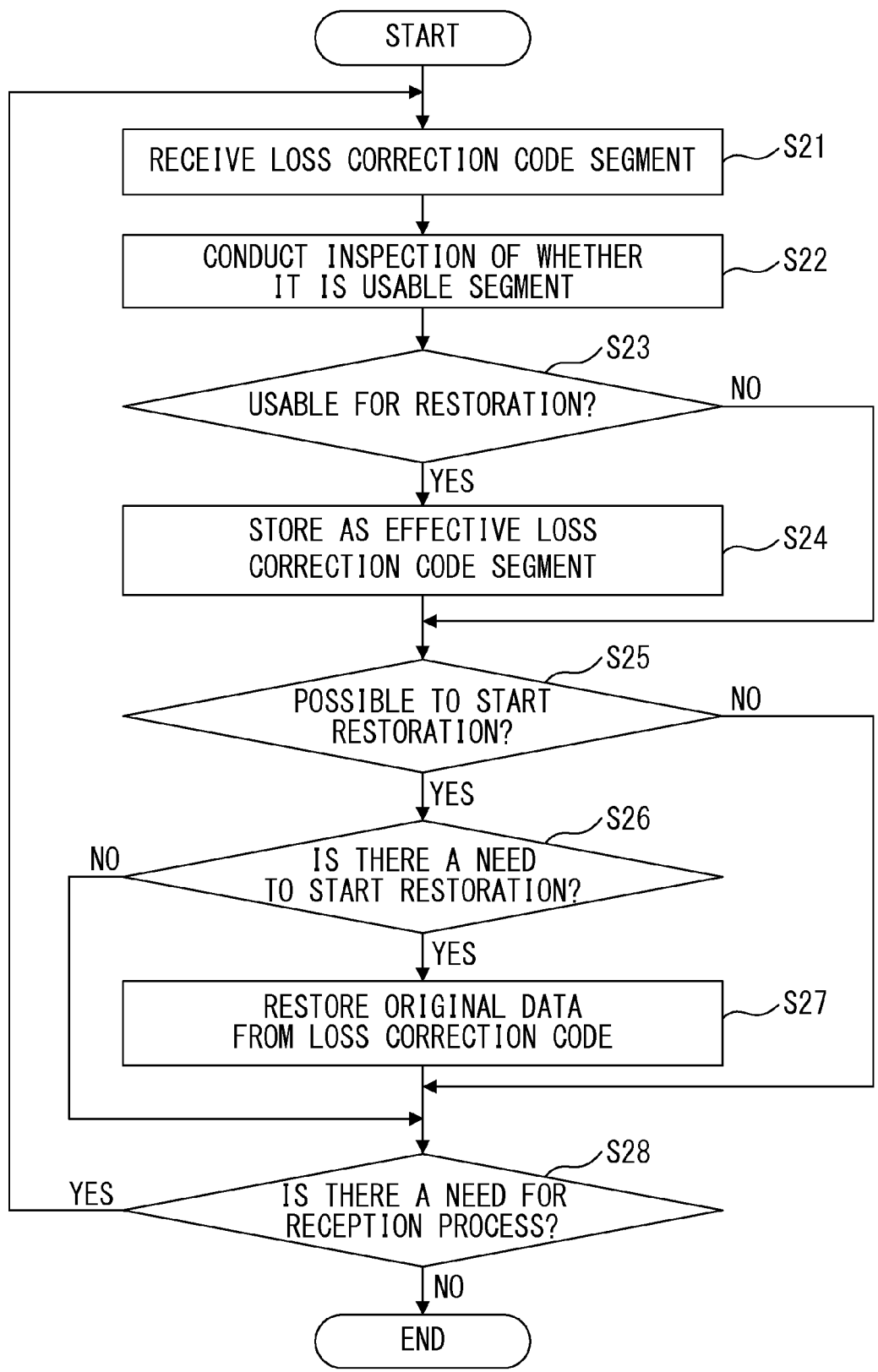
FIG. 11 is a flowchart of a segment reception/restoration process.

In the management node 21 for which there is a possibility that the management data will be restored from the loss-correction code segment 31, the segment reception/restoration process whose flowchart is illustrated in FIG. 11 is executed by the CPU 212 instead of the above segment reception process.

The process contents in S21 through S24 in FIG. 11 are basically similar to those in S11 through S14 in FIG. 10. Accordingly, explanations will be given for the processes in and after S25.

In S25, the CPU 212 refers to the management data segment preservation area 26b and determines whether or not it is possible to start the restoration of the management data. When as many loss-correction code segments 31 as are needed for the restoration of the management data have been stored in the corresponding individual preservation area 30 in the management data segment preservation area 26b, the determination in S25 is Yes, and the process proceeds to S26. When as many loss-correction code segments 31 as are needed have not been stored in the individual preservation area 30, the determination in S25 is No, and the process proceeds to S28.

In S26, the CPU 212 determines whether or not it is needed to start the restoration of the management data. When the node 21 of the CPU 212 has been given a task of restoring the management data from the received loss-correction code segment 31, the determination in S26 is Yes, and the process proceeds to S27. When the loss-correction code segment 31 of management data that is to be restored has not been received, the determination in S26 is No, and the process proceeds to S28.

In S27, the CPU 212 restores the management data by using the loss-correction code segment 31 stored in the corresponding individual preservation area 30 in the management data segment preservation area 26b. Next, the CPU 212 determines whether or not there is a different loss-correction code segment 31 that is to be received (S28). When there is a different loss-correction code segment 31 that is to be received, the determination in S28 is Yes, making the process return to S21, and the CPU 212 prepares to receive the next loss-correction code segment 31. When there is not a different loss-correction code segment 31 that is to be received, the determination in S28 is No, and then the segment reception/restoration process is terminated.

Figure 12:
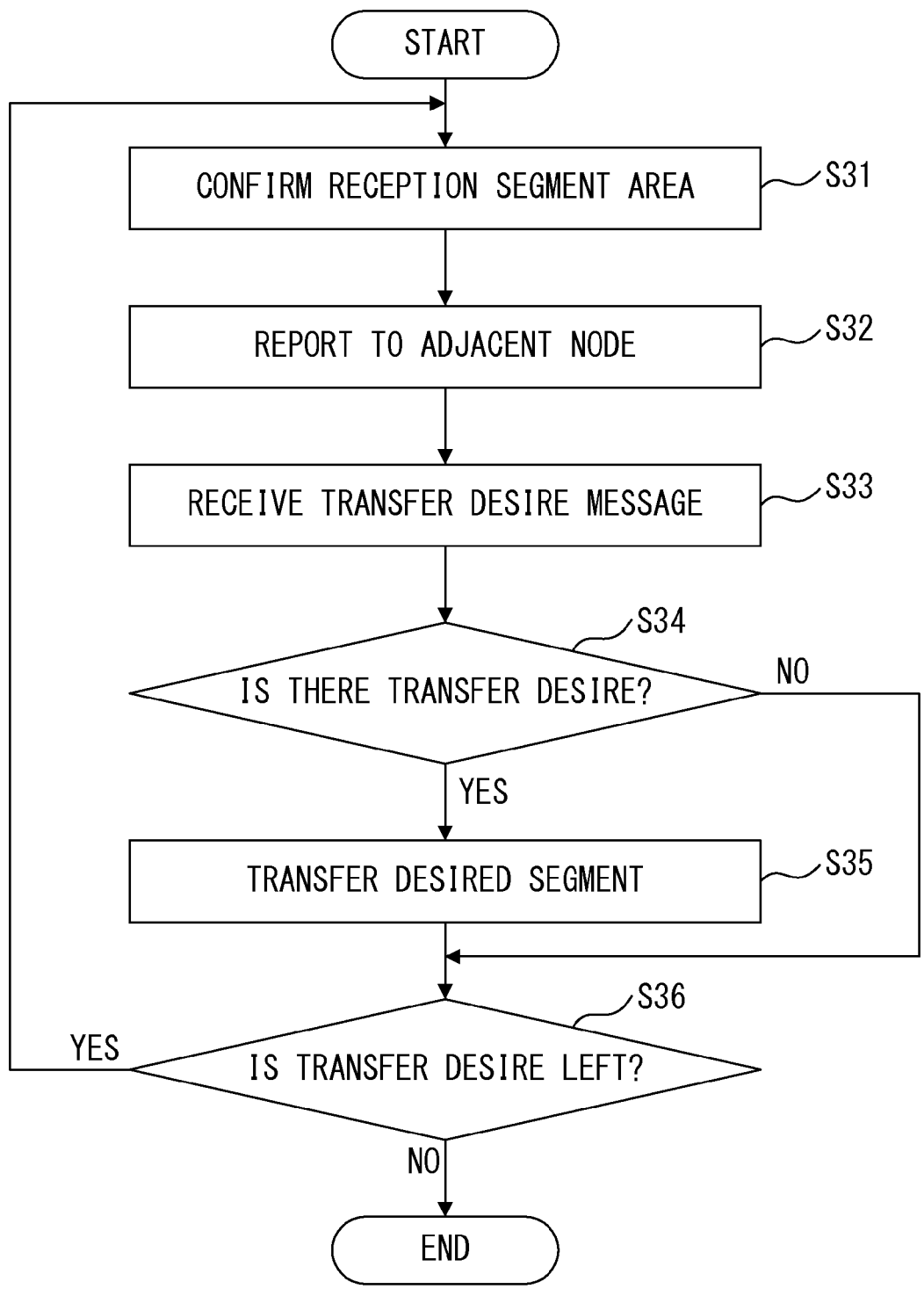
FIG. 12 is a flowchart of a segment transfer process.

FIG. 12 is a flowchart of a segment transfer process. As illustrated in FIG. 8A or FIG. 8B, this segment transfer process is a process executed by the respective management nodes 21 to which the loss-correction code segments 31 having been generated from the same management data were multicast. The management node 21 that executes this segment transfer process can confirm the delivery to other management nodes 21 and collect the loss-correction code segments 31.

First, the CPU 212 conducts the confirmation of the management data segment preservation area 26b (referred to as "reception segment area" in FIG. 12) and identifies the loss-correction code segment 31 that is to be transferred to a different management node 21 or the loss-correction code segment 31 that is needed (S31). In FIG. 12, the different management node 21 to which the loss-correction code segment 31 is to be transferred is referred to as an "adjacent node". These referenced names in the figure will be used in the following descriptions.

Next, when it was possible to identify the loss-correction code segment 31 that is to be transferred or the loss-correction code segment 31 that is needed, the CPU 212 reports the fact that the identifying succeeded to a corresponding adjacent node (S32), and waits for a transfer desire message to be received as a reply to the report to the adjacent node (S33). After the reception of this transfer desire message, the process proceeds to S34.

In S34, the CPU 212 determines whether or not the transfer desire message desires the transfer of the loss-correction code segment 31. When the transfer desire message has content that needs to be transferred, the determination is Yes, and the process proceeds to S35. When the transfer desire message has content that does not desire to be transferred, the determination is No, and the process proceeds to S36.

In S35, the CPU 212 transfers the desired loss-correction code segment 31 to an adjacent node. Next, the CPU 212 determines whether or not there is a different loss-correction code segment 31 left as a transfer target (S36). When the transfer of at least a sufficient number of loss-correction code segments 31 as to allow the restoration of the management data has not been completed, the determination in S36 is Yes, and the process returns to S31. When the transfer of at least a sufficient number of loss-correction code segments 31 as to allow the restoration of the management data has been completed, the determination in S36 is No, and then the segment transfer process is terminated.

Figure 13:
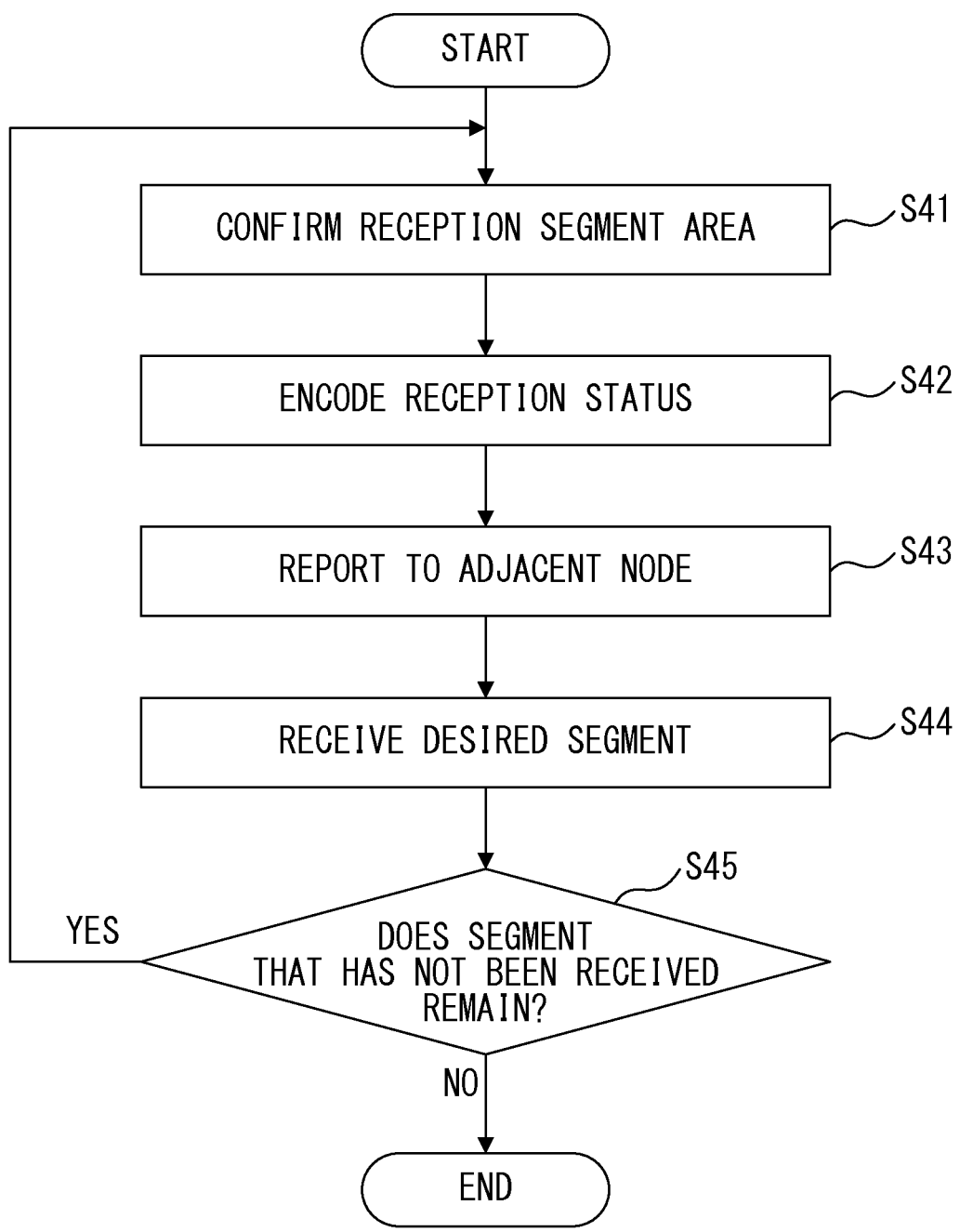
FIG. 13 is a flowchart of a transfer desire report process.

FIG. 13 is a flowchart of a transfer desire report process. This transfer desire report process is conducted for the purpose of allowing the respective management nodes 21 to which the loss-correction code segments 31 generated from the same management data have been multicast to collect as many loss-correction code segments 31 as are needed for the restoration of the management data.

First, the CPU 212 confirms the management data segment preservation area 26b (referred to as "reception segment area" in FIG. 12) (S41). Next, the CPU 212 encodes the reception (collection) status of the loss-correction code segments 31 (S42) so as to transmit the generated code to an adjacent node, and thereby reports the reception status (S43).

Thereafter, the CPU 212 waits for the loss-correction code segment 31 to be received from an adjacent node (S44). Receiving the loss-correction code segment 31, the CPU 212 determines whether or not the loss-correction code segment 31 that is needed remains (S45). When the loss-correction code segment 31 that is needed remains, the determination in S45 is Yes, and the process returns to S41 above. When the loss-correction code segment 31 that is needed does not remain, the determination in S45 is No, and then the transfer desire report process is terminated.

The respective management nodes 21 that need the transfer of the loss-correction code segments 31 execute the above transfer desire report process, and thereby as many loss-correction code segments 31 as are needed for the restoration of the management data are collected.

In the present embodiment, management data is divided so as to generate the loss-correction code segments 31; however, it is not needed to generate the loss-correction code segments 31 when a relatively small amount of data is to be transmitted. This is because effects such as the reduction in time used for communications and the reduction in the loads on the management nodes 21 are expected. These effects lead to the expectation that processes will be conducted at higher speeds. In such a case, the management data may be transmitted by multicast by for example following the transmission procedures illustrated in FIG. 14.

Figure 14:
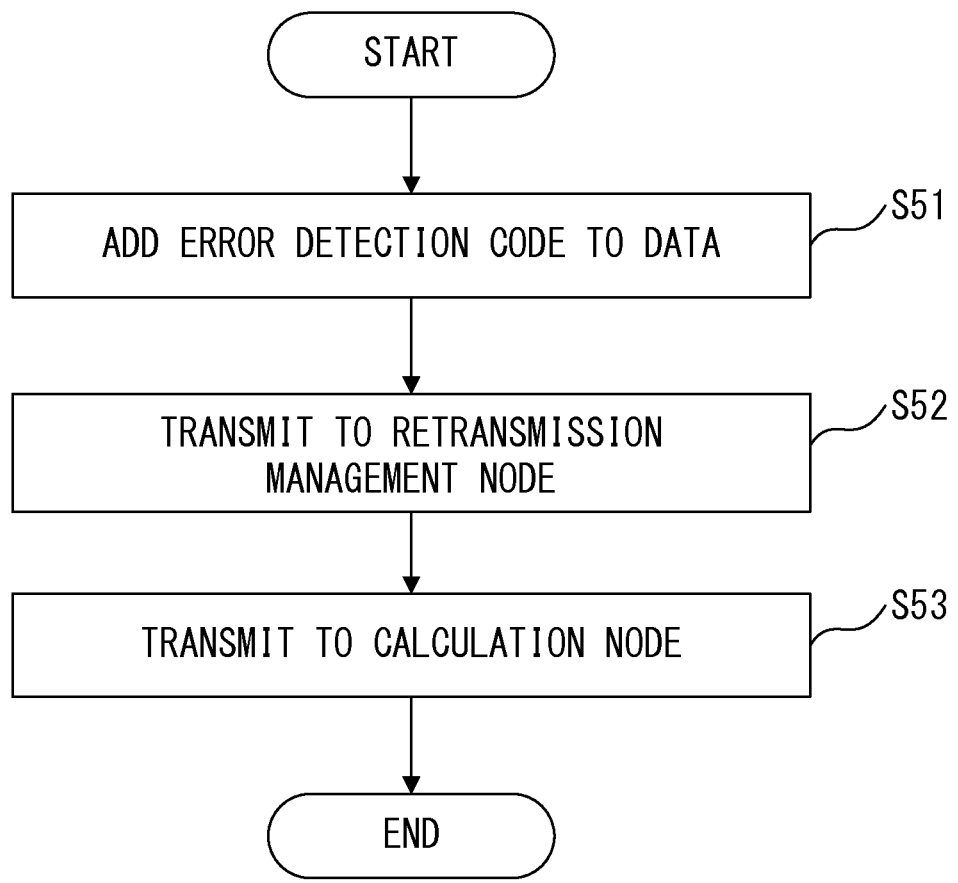
FIG. 14 illustrates an example of transmission procedures that can be applied when loss-correction code segments are not generated from data (variation example)

The transmission procedures illustrated in FIG. 14 are based on an assumption that the multicast transmission of management data is conducted by a dedicated node (retransmission management node). As illustrated in FIG. 14, the management node 21 adds, to management data, an error detection correction code (referred to as "error detection code" in FIG. 14) (S51), and transmits it to the retransmission management node (S52). The retransmission management node multicasts a message having stored the error detection code and the management data (S53). The management nodes 21 to which the message is to be multicast may be identified from the management nodes 21 that received the management data.

In the above situation described above, the multicast transmission of data from the management nodes 21 (management manipulation execution mechanisms 25 and management data preservation mechanisms 26) may be conducted on an as-needed basis. It is also possible to employ a configuration in which multicast transmission is conducted as a result.

Meanwhile, the CPU 212 of the management node 21 that received the message (management data) may be made to conduct the message reception process as illustrated in for example FIG. 15.

In this message reception process, the CPU 212 first receives a message received by the NIC 211 (S61). Next, the CPU 212 uses the error detection correction code in the received message so as to conduct calculation for determining the presence or absence of an error (bit corruption) (S62). The CPU 212 that has determined by the calculation that an error does not exist or an error that has occurred is correctable reports to an adjacent node a delivery confirmation representing that an appropriate message has been received (S63).

Next, explanations will be given for a different embodiment.

FIG. 17 explains a system configuration example to which a different embodiment has been applied. In this different embodiment, an inter-node arithmetic device 170 has been added/arranged as illustrated in FIG. 17. This inter-node arithmetic device 170 receives the loss-correction code segments 31 from the respective nodes 21 and restores management data.

In the above embodiment, management data is restored by the management nodes 21. However, the restoration of management data by the management nodes 21 needs the execution, by a program, of a transfer process, an arithmetic process, etc. of the loss-correction code segments 31 between the management nodes 21, which needs a relatively long period of time. In contrast, the restoration of management data by using the inter-node arithmetic device 170 make it possible to eliminate the need for the transfer of the loss-correction code segments 31 between the management nodes 21. Because the inter-node arithmetic device 170 can be optimized as a dedicated device, the restoration of management data can be conducted at a higher speed.

When the inter-node arithmetic device 170 is used, the CPU 212 of each management node 21 that has received the loss-correction code segment 31 may execute the following processes.

Figure 18:
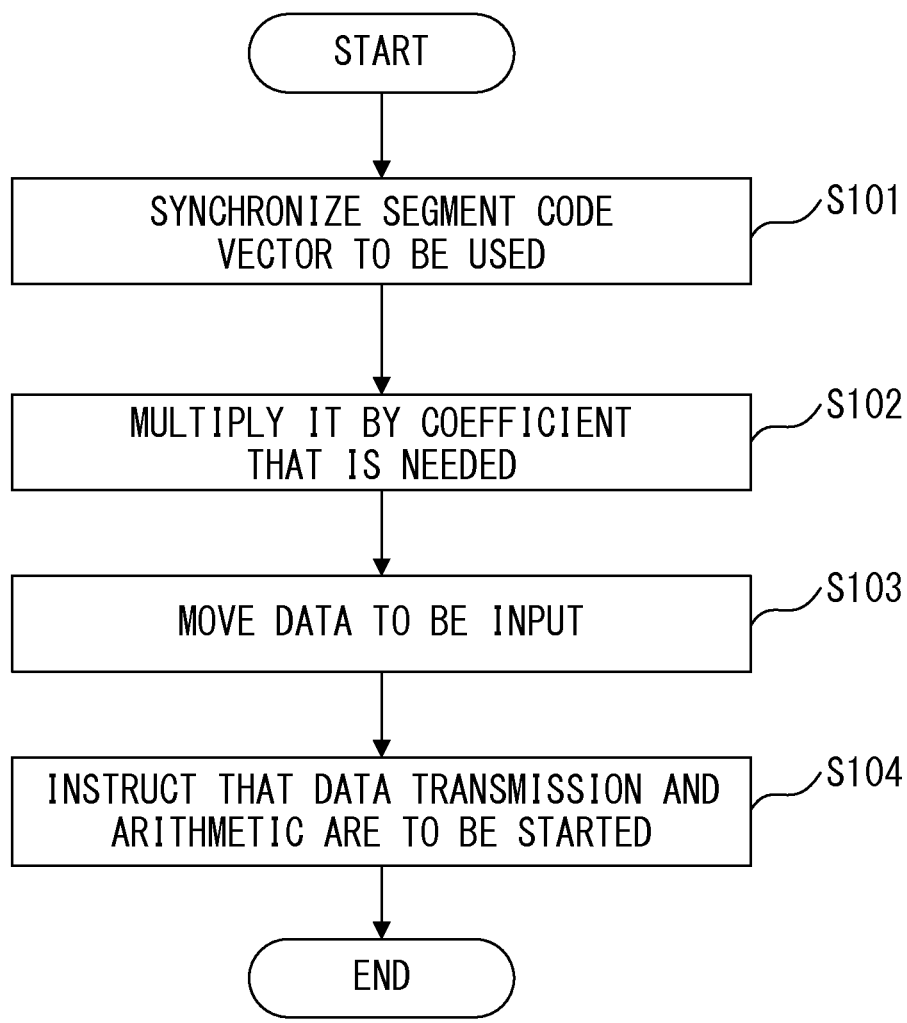
FIG. 18 is a flowchart of a management data restoration request process.

FIG. 18 is a flowchart of a management data restoration request process. This management data restoration request process is a process executed in order to achieve a situation where one management node 21 causes the inter-node arithmetic device 170 to restore management data.

First, the CPU 212 causes synchronization between segment code vectors that are to be used and the respective management nodes 21 that receive other loss-correction code segments 31 (S101). Next, the CPU 212 multiplies the loss-correction code segment 31 received by the management node 21 of the CPU 212 by a coefficient that is needed (S102).

Next, the CPU 212 makes other management nodes 21 prepare for the transmission of the loss-correction code segment 31 (on which an arithmetic (multiplication) process was performed) to the inter-node arithmetic device 170 (S103). Thereafter, the CPU 212 makes the respective management nodes 21 including the management node 21 of the CPU 212 transmit the loss-correction code segments 31 to the inter-node arithmetic device 170, and instructs them to start the restoration (arithmetic) of the management data (S104). The management data restoration request process is terminated thereafter.

Figure 19:
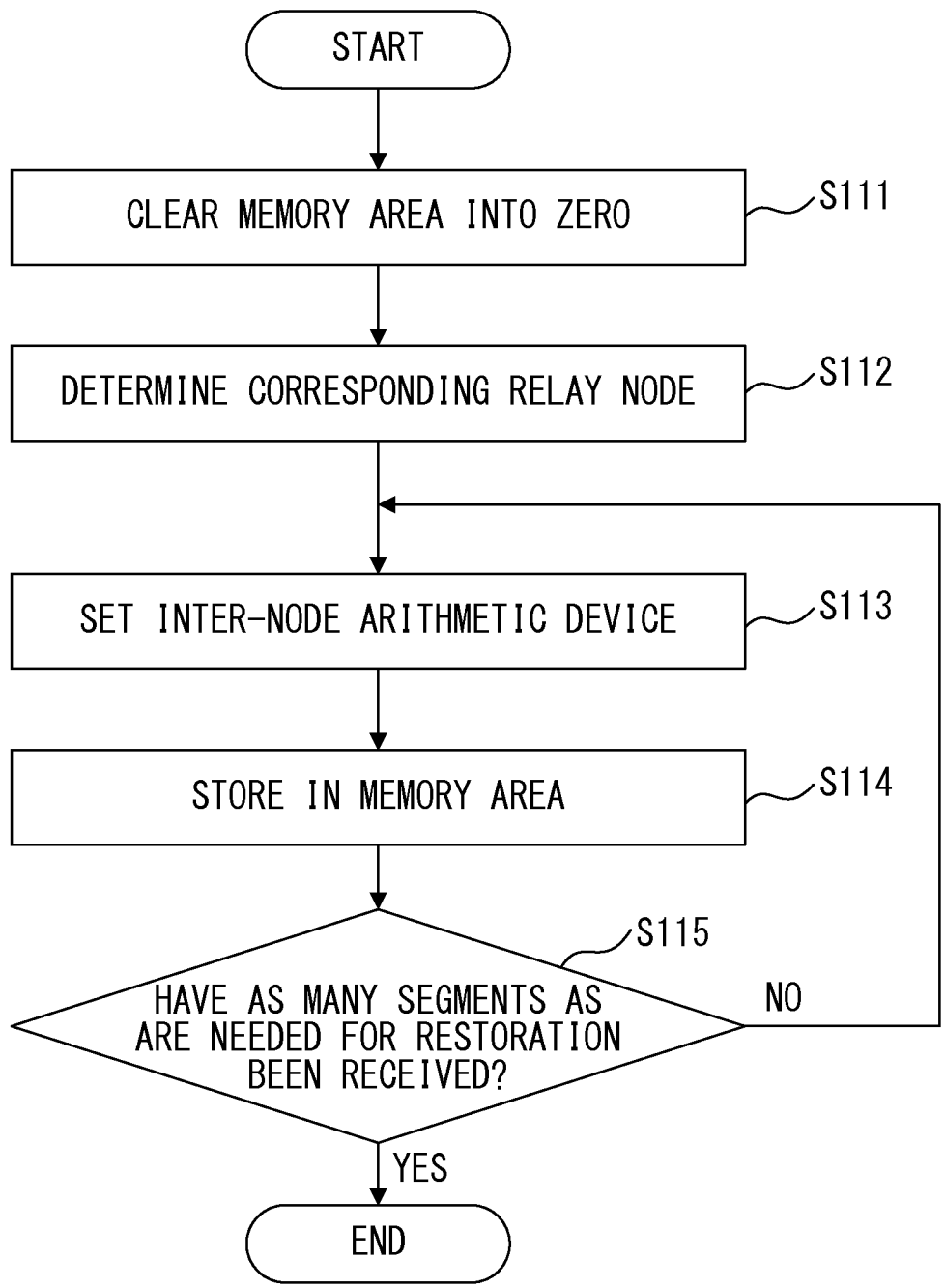
FIG. 19 is a flowchart of a management data restoration process.

FIG. 19 is a flowchart of a management data restoration process. This management data restoration process is executed by the inter-node arithmetic device 170.

The inter-node arithmetic device 170 first clears, to zero (S111), the memory area used for the restoration of the management data. Next, the inter-node arithmetic device 170 selects a linearly independent combination from among combinations of n segment code vectors, and determine the management node 21 (referred to as "relay node" in FIG. 19) 21 to which the selected combination is assigned (S112).

Next, the inter-node arithmetic device 170 conducts setting in such a manner that the management data is restored by using the selected combination on the basis of the arithmetic result from the specified management node 21 (S113). The CPU 212 that conducted the setting stores, in the memory area, the arithmetic result received from each management node 21 (S114).

Next, the CPU 212 determines whether or not as many arithmetic results as are needed for the restoration have been received (S115). When as many arithmetic results as are needed for the restoration have been received, the determination in S115 is Yes, and this management data restoration process is terminated after restoring the management data. When as many arithmetic results as are needed for the restoration have not been received, the determination in S115 is No, and the process returns to S113 described above.

According to a system to which the present invention has been applied, it is possible to promptly respond to multiple failures that occur in a management node while suppressing resources for a backup system.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing system comprising:
   a plurality of information processing apparatuses, each comprising a an apparatus processor and an apparatus memory, that are connected to each other; and
   a management device, comprising a device processor and a device memory, configured to divide a first number of pieces of management data needed for management of the plurality of information processing apparatuses into a second number of pieces of management data, the second number being equal to or greater than the first number, and to transmit the second number of pieces of management data obtained by the division respectively to other management devices,
   wherein the second number of pieces of management data comprise distributed loss correction codes distributed among the apparatuses allowing the distributed loss correction codes to be obtained from management devices of other apparatuses by a management device of an apparatus that has a fault and to be used by the management device of the apparatus with the fault to recover from the fault,
   wherein the loss correction code are divided into n data segments and n+k distributable segments are produced from the n data segments where k corresponds to a total number of failures to which the it is possible to respond allowing restoration of the loss correction codes with k segments where n and k are integers,
   wherein the management device treats, as each element of the second number of pieces of management data, each vector component of u=vG, which is an n+k dimensional vector (k is a positive integer) resulting from multiplying an n dimensional vector v by a finite field GF ($2^e$), the n dimensional vector v being a result of dividing the first number of pieces of management data of e bits (e is a positive integer) by n (n is a positive integer).

2. The information processing system according to claim 1, wherein
   the management device simultaneously and respectively transmits the second number of pieces of management data obtained by the division to the other management devices.

3. The information processing system according to claim 1, wherein
   the information processing system further includes a relay device that relays the second number of pieces of management data obtained by the division by the management device respectively to the other management devices.

4. The information processing system according to claim 1, wherein
   the plurality of information processing apparatuses are further connected to each other in a one-dimensional torus or a two-dimensional torus.

5. A system as recited in claim 1, wherein a number of redundant nodes comprises k/n rounded to an integer.

6. A management method of an information processing system including a plurality of information processing apparatuses connected to each other and a management device that manages the plurality of information processing apparatuses, the management method including:
   dividing by the management device a first number of pieces of management data needed for management of the plurality of information processing apparatuses into a second number of pieces of management data, the second number being equal to or greater than the first number; and
   transmitting by the management device the second number of pieces of management data obtained by the division respectively to other management devices,
   wherein the second number of pieces of management data comprise distributed loss correction codes distributed among the apparatuses allowing the distributed loss correction codes to be obtained from management devices of other apparatuses by a management device of an apparatus that has a fault and to be used by the management device of apparatus with the fault to recover from the fault,
   wherein the loss correction code are divided into n data segments and n+k distributable segments are produced from the n data segments where k corresponds to a total number of failures to which the it is possible to respond allowing restoration of the loss correction codes with k segments where n and k are integers,
   wherein the management device treats, as each element of the second number of pieces of management data, each vector component of u=vG, which is an n+k dimensional vector (k is a positive integer) resulting from multiplying an n dimensional vector v by a finite field GF ($2^e$), the n dimensional vector v being a result of dividing the first number of pieces of management data of e bits (e is a positive integer) by n (n is a positive integer).

7. A method as recited in claim 6, wherein a number of redundant nodes comprises k/n rounded to an integer.

8. A non-transitory computer-readable recording medium having stored therein a management program of an information processing system including a plurality of information processing apparatuses connected to each other and a management device that manages the plurality of information processing apparatuses, the management program causing the management device to execute a process comprising:
   dividing a first number of pieces of management data needed for management of the plurality of information processing apparatuses into a second number of pieces of management data, the second number being equal to or greater than the first number; and
   transmitting the second number of pieces of management data obtained by the division respectively to other management devices,
   wherein the second number of pieces of management data comprise distributed loss correction codes distributed among the apparatuses allowing the distributed loss correction codes to be obtained from management devices of other apparatuses by a management device of an apparatus that has a fault and to be used by the management device of apparatus with the fault to recover from the fault,
   wherein the loss correction code are divided into n data segments and n+k distributable segments are produced from the n data segments where k corresponds to a total number of failures to which the it is possible to respond allowing restoration of the loss correction codes with k segments where n and k are integers,
   wherein the management device treats, as each element of the second number of pieces of management data, each vector component of u=vG, which is an n+k dimensional vector (k is a positive integer) resulting from multiplying an n dimensional vector v by a finite field GF ($2^e$), the n dimensional vector v being a result of dividing the first number of pieces of management data of e bits (e is a positive integer) by n (n is a positive integer).

9. A medium as recited in claim 8, wherein a number of redundant nodes comprises k/n rounded to an integer.

* * * * *